United States Patent [19]

Dondl

[11] Patent Number: 4,827,421

[45] Date of Patent: May 2, 1989

[54] TELECOMMUNICATIONS SATELLITE SYSTEM ON QUASI-STATIONARY ORBITS

[75] Inventor: Peter Dondl, Rossdorf, Fed. Rep. of Germany

[73] Assignee: Siemens Aktiengesellschaft, Berlin and Munich, Fed. Rep. of Germany

[21] Appl. No.: 24,579

[22] Filed: Mar. 11, 1987

[30] Foreign Application Priority Data

Mar. 11, 1986 [DE] Fed. Rep. of Germany ....... 3607931

[51] Int. Cl.$^4$ ..................... G01C 21/00; H04B 7/185
[52] U.S. Cl. ..................................... 364/459; 342/356
[58] Field of Search .................. 364/459, 424; 455/12; 214/159, 158; 342/152, 356, 357, 358

[56] References Cited

U.S. PATENT DOCUMENTS 4,502,051 2/1985 Dondl ................................ 342/356

FOREIGN PATENT DOCUMENTS 3145207.8 9/1982 Fed. Rep. of Germany .
3437317.9 4/1986 Fed. Rep. of Germany .

OTHER PUBLICATIONS

NTZ Archiv Heft, 12/1983, "Loopus Erschlie t dem Satellitenfunk Ein Neue Dimensions".

*Primary Examiner*—Theodore M. Blum
*Assistant Examiner*—Gregory C. Issing
*Attorney, Agent, or Firm*—Hill, Van Santen, Steadman & Simpson

[57] ABSTRACT

In a telecommunications satellite system operating with quasi-stationary orbits and comprising a plurality of earth satellites having elliptical orbits appearing at nearly the same location in space in cyclical succession and relieving one another in radio operation, a different range of the respective satellites to be engaged and disengaged from the ground stations is guaranteed. This enables an additional transit time for storage of data transmitted about the switching time from one satellite to another. To this end, the apogee of the orbital ellipse is shifted to such a degree from the Northern-most or, respectively, Southern-most orbital point against the direction of flight of the respective satellite that an adequate signal repetition of the bits to be transmitted occurs about the switching time. In a specific system comprising three satellites on elliptical orbits having an eccentricity of 0.713 and orbital times of 12 hours, a guaranteed radio spacing difference of one satellite relieving another of 75 km from ground stations occurs given a shift of the apogee from the Northern-most orbital point by 0.2° against the flight direction of the satellites. The lengthening of the propagation time therefore obtainable corresponds to a repetition of 1.024 bits given a rate of 2.048 Mbit/s.

6 Claims, 2 Drawing Sheets

TELECOMMUNICATIONS SATELLITE SYSTEM ON QUASI-STATIONARY ORBITS

BACKGROUND OF THE INVENTION

1. Field of the Invention

The present invention is directed to a telecommunications satellite system on quasi-stationary orbits comprising a plurality of earth satellites having an elliptical orbit and which appear seen from an earth station at nearly the same point in space in cyclical sequence and which relieve one another with respect to radio range.

2. Description of the Prior Art

In telecommunications satellites on quasi-stationary orbits whose ground paths are theoretically congruent and comprise one or more closed loops, a system of satellites is involved in which the chronological graduation and a satellite switching strategy provide that geostationary, position loops which are uninterruptedly traversed by satellites of changing identity, arise.

Telecommunications satellite systems comprising geostationary position loops in which the two orbital arms of the loops meet and satellite collisions are avoided by the inaccuracies in orbit (probability of about $10^{-9}$ per encounter) are disclosed in the German OS 31 45 207 and in a publication "Loopus erschliesst dem Satellitenfunk eine neue Dimension", NTZ Archive No. 12/1983.

Given application of a digital transmission method via the satellite broadcast link, a few bits in the transmitted radio signal can be lost at the time of satellite switching when this is not prevented by suitable measures. One possibility is to assure that the overall radio link is somewhat longer after the switching than before switching. As a result thereof, the last signal tail of the transmission via the satellite departing the loop position is repeated at the head of the signal of the transmission via the satellite entering into the loop. This bit sequence doubly received in the receiving ground station can be employed for synchronization and a seamless joining of the transmitted information in order to guarantee interruption-free signal flow via the interface to the terestrial telecommunications network.

Digital transmission methods which operate on the principle set forth above are disclosed in the German OS 34 37 317.

Precise studies have shown, however, that given the known orbital geometry and constellation, this digital transmission:

- can either not be continually carried out given all switching instances; or the transmission capacity cannot be optimally exploited.

If one wishes to reliably operate the described transmission method via geostationary position loops with optimum transmission capacity, the geometry of the radio links must be taken into consideration. The participating, follow-up ground stations track the active satellites. The sectional volume of all antenna main lobes of these ground stations is composed of a double cone around the active satellites whose one tip is directed in the direction of the earth and whose other tip is directed in the opposite direction, as shall be set forth below with reference to FIG. 2. In order to work free of interruption in terms of radio engineering, it is necessary that the successor or following satellite assume the telecommunications function within the double cone.

Given the known orbit constellation in which the two satellites theoretically meet, the two requirements of "switching in the double cone" and "successor satellite at a greater distance than the active satellite" are not possible in all switchovers and given an optimally-designed radio link. It is not inconsiderable in a portion of the instances, either the successor satellite will have to be switched outside of the double cone (gain/fade) or the signal repetition due to lengthening of the radio link will not occur (disturbance of the freedom from interruption).

SUMMARY OF THE INVENTION

The above difficulties are avoided, according to the present invention, by a slight modification of the orbits of the satellites relieving one another in such a system, which is characterized in that, for this purpose, the apogee of the orbital ellipse is shifted to such a degree from the Northern-most or, respectively, Southern-most orbital point against the flight direction of the respective satellite that an adequate signal repetition of the bits to be transmitted occurs about the time of the switching point. An advantageous feature of the invention is that in a special system three satellites orbit on elliptical orbits having an eccentricity of 0.713 and an orbital time of 12 hours. Another feature of the invention is particularly characterized in that the shift of the apogee relative to the Northern-most orbital point amounts to 0.2° and, therefore, the angle "ascending node, earth-center, apogee" amounts to 89.8°.

Another feature of the invention is particularly characterized in that the shift of the apogee relative to the Southern-most orbital point amounts to 0.2° and, therefore, the angle "descending node, earth's center, apogee" amounts to 89.8°.

A further feature of the invention is particularly characterized in that a radial spacing difference of the satellite relieving another is about 75 km relative to the ground stations, and, therefore, a lengthening of the propagation time for the forward and return directions of 0.5 ms is guaranteed with the shift of the apogee of 0.2°, taken into consideration the maximally-allowed orbital tolerances and the beam direction of the ground stations obliquely impinging the satellite orbits.

Since, given the orbit constellation of the present invention, the apogee of the orbit ellipses does not lie in the Northern-most/Southern-most orbital point, but is adquately shifted with respect to the flight direction of the respective satellite in its orbital plane, the orbiting of the relieving satellite, including the orbit tolerances, proceeds behind the active satellite and through the double cone. The digital transmission method set forth in brief above can therefore be applied without disruption.

The advantages of the present invention therefore are that the turning of the orbital ellipses in their planes provides that the relieving satellite lies nearly ideally within the ground station antenna lobes at the switching time, these being directed onto the relieving satellite, although the satellites differ considerably in terms of their distance from the earth.

The advantage of the present invention is further that the transmitting ground stations can work just as in a traditional, geostationary system. The receiving ground stations receive the information concerning the satellite switching on the basis of the Doppler discontinuity of the incoming radio signal. The ground communication stations can therefore be autonomously operated. They operate independently of the remote satellite satellite monitoring and of the switching strategy.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
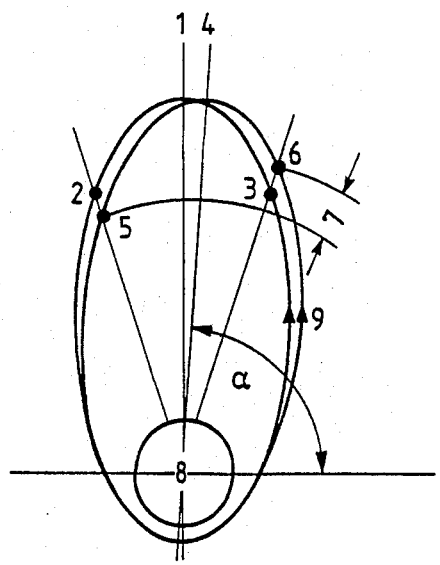
FIG. 1 is a schematic representation of the principle of the present invention.

FIG. 1 illustrates, according to the present invention, the shift of the orbital ellipse. In the known position of the orbital ellipse having the line of apsides 1, the range between the earth 8 and the orbital point of the satellite 2 to be disconnected and that between the earth and a satellite 3 to be engaged are identical. By turning the orbital ellipse against the flight direction 9 of the satellite to the position having a new line of apsides 4, the point 2 shifts to the point 5 and the point 3 shifts to the point 6. A spacing difference 7 is therefore present in the switching time.

The turning of the orbital ellipse amounts to $90° - \alpha$, where $\alpha$ identifies the angle whose origin lies in the center of the earth and whose one leg extends through the ascending node in the equitorial plane and whose other line extends through the apogee of the orbital ellipse, whereby the ascending node is the intersection of the ascending, i.e. northward proceeding, satellite orbit with the equatorial plane, and the descending node is the intersection of the descending, i.e. southward proceeding satellite orbit with the equatorial plane.

Figure 2:
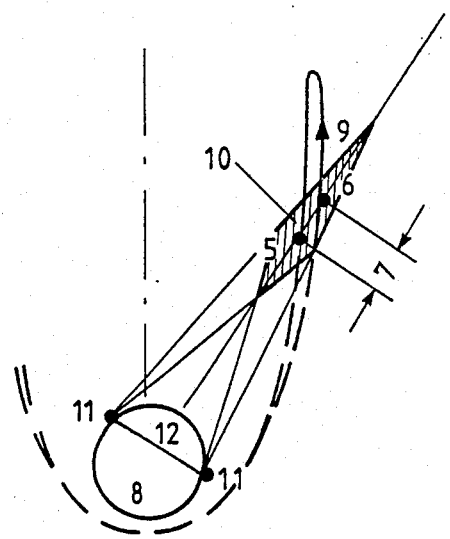
FIG. 2 is a schematic representation of the formation of the resultant antenna lobes of the ground stations as a double cone.

FIG. 2 illustrates the earth 8 having two ground stations 11 located at the edge of illumination. The major lobes of these ground stations and further ground stations constructed along the contour 12 describe a section volume 10 in a double conical form. In interaction with the earth's rotation, the elliptical orbit arc from the point 6 to the point 5 in FIG. 1 seems to become a loop. From the standpoint of the participating ground station, it appears closed. In profile, however, it is opened at the switching location, as in FIG. 2, so that the satellites relieving one another have the spacing 7.

Figure 3:
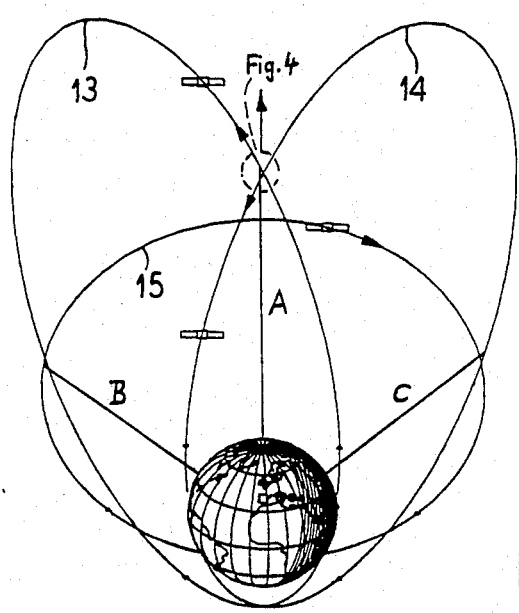
FIG. 3 is a schematic representation of an exemplary embodiment of the invention illustrated in a perspective view.

As shown in FIG. 3, an exemplary embodiment is a satellite system comprising three satellites on three elliptical orbits 13, 14 and 15 whose ascending nodes are at a respective distance of 120°, having an orbital time of about 12 hours. The inclination amounts to about 63.4°. The angle "ascending node, earth's center, apogee" amounts to 89.8°. In order to be able to better see its deviation from the perpendicular, this angle is illustrated somewhat smaller as the angle $\alpha$ in FIG. 1. In fact, the deviation from the perpendicular amounts to only 0.2° = 12 arc minutes. The respective satellite therefore traverses its apogee shortly before the Northern-most point of its orbit.

Figure 4:
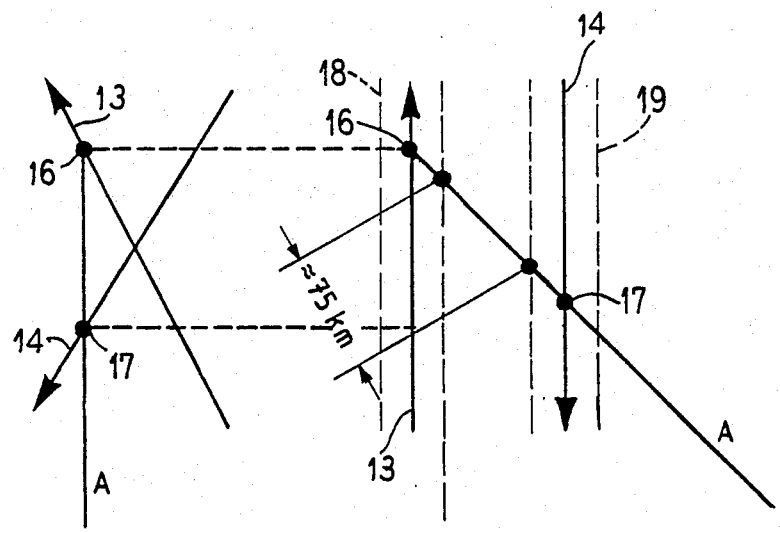
FIG. 4 is an enlarged schematic representation of a portion of FIG. 3 taking the orbit tolerances into consideration.

The three satellites fly over the same sub-satellite path in the time interval of about 8 hours. Earth's center, the surrender point and the acceptance point in the orbit respectively lie on a straight line as shown at A, B and C. As a result of the interaction of the earth's rotation, the sub-satellite path contains two loops. With the value of 0.713, the eccentricity of the orbits is selected such that the loop transit time amounts to two-thirds of the orbit, i.e. about 8 hours. As seen from the ground stations (more accurately from the intersecting or contacting point of each loop of the sub-satellite track), a descending and an ascending satellite respectively meet at the same location in space where the telecommunications function is switched, meeting in the 8 hour rhythm. In an enlarged scale, the left-hand portion of FIG. 4 shows the mean transfer point-of FIG. 3. The beam A is attenuated because of the perspective. The right-hand portion of FIG. 4, by contrast, shows beam A in its true dimensional size.

As a result of the shift of the apogee from the Northern-most point against the flight direction, the altitude along beam A of the accepting satellite 16 is about 209 km greater than that of the surrendering satellite 17 as illustrated on the right in FIG. 4.

The respective tolerance tubes 18 and 19 (shown with broken lines) for satellite orbits in such systems realistically have a radius of about 45 km due to known (correction fuel economy considerations). Since the ground station beam directions obliquely impinge the orbits, the guaranteed radial spacing difference of about 75 km ultimately remains.

In the upward and downward directions, therefore, the satellite radio link is lengthened by 150 km. This corresponds to a lengthening of the propagation time by 0.5 ms. Given the transmission of a standard channel having 2.048 Mbit/s transmission rate, this corresponds to a repetition of 1024 bits.

After subtracting a few bits which are lost due to inaccuracies in the orbit tracking and in the switching, 900–1000 bits still remain for synchronization for the data streams, as set forth elsewhere.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of operating a telecommunications satellite system having a plurality of satellites, said method comprising the steps of:

respectively launching each of the said satellites in differently oriented quasi-stationary elliptical orbits around the earth, each satellite traveling in a flight direction in its orbit;

successively engaging and disengaging said satellites by sending bit sequences in a propagation direction with at least one ground station, at a time at which a satellite to be disengaged is at substantially the same location in space with a satellite to be engaged;

repeating a number of bits last sent to said satellite a number of bits last sent to said satellite to be disengaged as bits first sent to said satellite to be engaged;

selecting at the time of launching an orbit for each satellite having an apogee shifted by a selected fixed angle opposite the flight direction for that satellite, relative to an orbital point of maximum latitude for that satellite, so that a selected distance exists between said satellites to be disengaged and engaged at said location in space, thereby lengthening the propagation time along said propagation direction for sending said bit sequences to a farther of said satellites to be disengaged and engaged; and selecting said fixed angle to lengthen said propagation time based on the selected number of said bits to be repeated.

2. A method as claimed in claim 1, wherein the step of respectively launching each of said satellites is further defined by:

respectively launching each of said satellites in respective elliptical orbits each having an eccentricity of 0.713 and an orbital time of 12 hours.

3. A method as claimed in claim 1, wherein each of said orbits has an ascending node which is the point at which the orbit crosses the equatorial plane, and wherein the step of selecting said fixed angle is further defined by:

selecting said fixed angle so that the apogee for an orbit is shifted relative to said point of maximum latitude by 0.2°, with an angle defined by said ascending node, the center of the earth, and said apogee being 89.8°.

4. A method as claimed in claim 3, wherein each of said orbits has a maximum orbital tolerance, and wherein the step of selecting at the time of launching an orbit for each satellite having a apogee shifted by a selected fixed angle is further defined by:

selecting at the time of launching an orbit for each satellite having an apogee selected by 0.2°, opposite the flight direction for that satellite, relative to the orbital point of maximum latitude for that satellite so that a distance of 75 km, relative to said ground station, exists between respective maximum orbital tolerances of said satellites to be disengaged and engaged at said location in space, thereby lengthening the propagation time along said propagation direction for sending said bit sequences by 0.5 ms.

5. A method as claimed in claim 1, wherein the step of selecting at the time of launching and orbit for each satellite having an apogee shifting by a selected fixed angle is further defined by:

selecting at the time of launching an orbit for each satellite having an apogee shifted by a selected fixed angle, opposite the flight direction for that satellite, relative to the northern most orbital point for that satellite, so that a selected distance exists between said satellites to be disengaged and engaged at said location in space, thereby lengthening the propagation time along said propagation direction for sending bit said sequences.

6. A method as claimed in claim 1, wherein the step of selecting at the time of launching an orbit for each satellite having an apogee shifted by a selected fixed angle is further defined by:

selecting at the time of launching an orbit for each satellite having an apogee shifted by a selected fixed angle, opposite the flight direction for that satellite, relative to a southern most orbital point for that satellite, so that a selected distance exists between said satellites to be disengaged and engaged at said location in space, thereby lengthening the propagation time along said propagation direction for sending said bit sequences.

* * * * *

UNITED STATES PATENT AND TRADEMARK OFFICE
CERTIFICATE OF CORRECTION

PATENT NO. : 4,827,421
DATED : May 2, 1989
INVENTOR(S) : Peter Dondl

It is certified that error appears in the above—identified patent and that said Letters Patent is hereby corrected as shown below:

Entry [73] on the front page of the patent should show the following Assignees:

1) Siemens Aktiengesellschaft, Berlin and Munich, Federal Republic of Germany
2) ANT Nachrichtentechnik GmbH, Backnang, Federal Republic of Germany
3) Messerschmitt-Boelkow-Blohm GmbH, Ottobrunn, Federal Republic of Germany Signed and Sealed this Twenty-first Day of August, 1990

Attest:

HARRY F. MANBECK, JR.

Attesting Officer     Commissioner of Patents and Trademarks